US00RE49883E

(19) United States
(12) Reissued Patent
Daniels et al.

(10) Patent Number: US RE49,883 E
(45) Date of Reissued Patent: Mar. 26, 2024

(54) WATER HEATER WITH MIX TANK FLUID TIME DELAY FOR CAUSAL FEEDFORWARD CONTROL OF HOT WATER TEMPERATURE

(71) Applicant: Watts Regulator Co., North Andover, MA (US)

(72) Inventors: Mark Daniels, Valley Cottage, NY (US); Adrian Voicu, Bloomfield, NJ (US)

(73) Assignee: Watts Regulator Co., North Andover, MA (US)

(21) Appl. No.: 17/452,265

(22) Filed: Oct. 26, 2021

Related U.S. Patent Documents

Reissue of:
(64) Patent No.: 10,852,008
Issued: Dec. 1, 2020
Appl. No.: 16/227,063
Filed: Dec. 20, 2018

(51) Int. Cl.
*F24D 19/10* (2006.01)
*F24D 3/10* (2006.01)
(Continued)

(52) U.S. Cl.
CPC ..... *F24D 19/1051* (2013.01); *F24D 3/1091* (2013.01); *F24D 17/001* (2013.01);
(Continued)

(58) Field of Classification Search
CPC ..... F24H 9/136; F24H 9/2007; F24H 15/315; F24D 3/1091; F24D 17/0031;
(Continued)

(56) References Cited

U.S. PATENT DOCUMENTS 8,528,503 B2 * 9/2013 Deacon ..... F24D 11/002 122/1 C
8,910,880 B2 * 12/2014 Farrell ..... F24H 8/00 237/8 A (Continued)

FOREIGN PATENT DOCUMENTS

DE 102005040792 B3 2/2007
DE 102016102718 A1 8/2017

(Continued)

OTHER PUBLICATIONS

European Patent Office, Extended European Search Report for corresponding European Application No. EP19214116.6 dated Apr. 3, 2020 (10 pgs).

(Continued)

*Primary Examiner* — William E Dondero
(74) *Attorney, Agent, or Firm* — Harris Beach PLLC

(57) ABSTRACT

A water heater includes a heat exchanger. A controllable three-way proportional valve provides a proportionally controllable flow to the hot water inlet of the heat exchanger and a boiler return water outlet. A mixing tank mixes a cold water and a hot water. The mixing tank provides a time delayed mixed water. A temperature sensor is disposed in or on the mixing tank to measure a temperature of the time delayed mixed water to provide a time delayed mixed water temperature. A feedforward control process running on a processor adjusts a proportional operating position of the controllable three-way proportional valve to regulate a temperature of hot water at the hx domestic hot water outlet based on the temperature of the time delayed mixed water temperature. A method for controlling a hot water temperature of a water heater a water heater using a flowmeter based feedforward control are also described.

20 Claims, 15 Drawing Sheets

(51) Int. Cl.
*F24D 17/00* (2022.01)
*F24H 9/13* (2022.01)

(52) U.S. Cl.
CPC ..... *F24D 17/0031* (2013.01); *F24D 17/0078* (2013.01); *F24H 9/136* (2022.01); *F24D 2220/0207* (2013.01); *F24D 2220/0228* (2013.01); *F24D 2220/0235* (2013.01); *F24D 2220/042* (2013.01); *F24D 2220/044* (2013.01); *F24D 2220/06* (2013.01); *F24D 2240/00* (2013.01)

(58) Field of Classification Search
CPC ..... F24D 2220/0235; F24D 2220/042; F24D 2220/044; F24D 2240/00
See application file for complete search history.

(56) References Cited

U.S. PATENT DOCUMENTS 9,063,551 B2 * 6/2015 Deivasigamani .... G05D 7/0629
9,506,670 B2 11/2016 Vanthournout et al.
9,869,490 B2 * 1/2018 Min ..... F24H 1/52
RE46,708 E * 2/2018 Karamanos ..... F24F 13/30
10,480,826 B2 * 11/2019 Paine ..... F24H 9/2028
2011/0017152 A1 * 1/2011 Min ..... F24D 19/1024 122/19.1
2016/0138829 A1 * 5/2016 Park ..... F24D 19/1066 122/14.1
2019/0293303 A1 * 9/2019 Zhang ..... F24D 19/106
2020/0080730 A1 * 3/2020 Paine ..... F24D 17/0026

FOREIGN PATENT DOCUMENTS

EP 2413048 A1 2/2012
WO WO-2011078767 A1 6/2011

OTHER PUBLICATIONS

Plateflow Plate Heat Exchanger With Buffer Vessel Brochure, McDonald Water Storage (2 pgs).
SmartPlate Water Heaters—An Advanced Approach to Water-to-Water Heating Brochure, 2018, Aerco International, Inc. (8 pgs).

* cited by examiner

| | | |
|---|---|---|
| T1 | 140 | Domestic water Set-point (inlet to mix tank from pump) |
| T2 | 55 | Inlet City/Make-up water Temperature (GPM Supply) |
| GPM_recir | 8 | |

| GPM_supply | 5 | 10 | 20 | 30 | 40 | 50 | 60 | 70 | 80 | 90 |
|---|---|---|---|---|---|---|---|---|---|---|
| T3 | 107.3 | 92.8 | 79.3 | 72.9 | 69.2 | 66.7 | 65.0 | 63.7 | 62.7 | 61.9 |

1st order FF model

6th order FF model

Boiler Side

| BTU/HR to BPHX | 10% | 20% | 30% | 40% | 50% | 60% | 70% | 80% | 90% | 100% |
|---|---|---|---|---|---|---|---|---|---|---|
| 3-way valve position - degrees | 9 | 18 | 27 | 36 | 45 | 54 | 63 | 72 | 81 | 90 Fully Open |

Mix water Temp vs. Valve Position

| | | | | | | | | | | |
|---|---|---|---|---|---|---|---|---|---|---|
| T3 (F) | 107.3 | 92.8 | 79.3 | 72.9 | 69.2 | 66.7 | 65.0 | 63.7 | 62.7 | 61.9 |
| Valve Position (degrees open)* | 9 | 18 | 27 | 36 | 45 | 54 | 63 | 72 | 81 | 90 |

WATER HEATER WITH MIX TANK FLUID TIME DELAY FOR CAUSAL FEEDFORWARD CONTROL OF HOT WATER TEMPERATURE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE APPLICATION

The application relates to hot water heaters and particularly to heat exchanger water type water heaters.

BACKGROUND

Water heaters heat domestic water to provide hot water for a building. Heat exchanger type hot water heaters transfer heat energy from a flow of heated gas or heated water, to heat a domestic cold water to provide a supply of domestic hot water.

SUMMARY

According to one aspect, a water heater includes a heat exchanger (hx) having a hx hot water inlet, a hx water return outlet, a hx domestic cold water inlet, and a hx domestic hot water outlet. A controllable three-way proportional valve has a boiler water hot water inlet adapted to accept a boiler water, and to provide a proportionally controllable flow to said hx hot water inlet and a boiler return water outlet. The boiler return water outlet is adapted to return a boiler return water to the boiler. A mixing tank (mt) has a mt cold water inlet adapted to receive a cold water from a source of domestic cold water, a mt hot water inlet, and a mt mixed water outlet. The mixing tank mixes the cold water and a hot water from the mt hot water inlet. The mixing tank provides a time delayed mixed water. A constant flow pump is fluidly coupled to and disposed between the hx domestic hot water outlet and the mt hot water inlet. A temperature sensor is disposed in or on the mixing tank to measure a temperature of the time delayed mixed water to provide a time delayed mixed water temperature. A processor is operatively coupled to the temperature sensor and operatively coupled to the controllable three-way proportional valve. The processor runs a feedforward control process based on the temperature of the time delayed mixed water to control a flow of boiler water into the heat exchanger. The feedforward control process adjusts a proportional operating position of the controllable three-way proportional valve to regulate a temperature of hot water at the hx domestic hot water outlet based on the temperature of the time delayed mixed water temperature.

In one embodiment, the constant flow pump is a variable speed pump having a plurality of preset or selectable constant flow rates.

In another embodiment, the mixing tank includes at least two chambers separated by at least one baffle with at least one opening in the at least one baffle.

In yet another embodiment, the at least two chambers include a mixing chamber and a fluid time delay chamber.

In yet another embodiment, the at least one baffle includes an open V-shaped bend to enhance a mixing action in the mixing chamber.

In yet another embodiment, the at least one opening in the at least one baffle is disposed about adjacent to a first end of the mixing tank.

In yet another embodiment, the temperature sensor is disposed in the first end of the mixing tank.

In yet another embodiment, the mixing tank includes a plurality of baffles, each baffle having at least one opening to provide a serpentine flow path through the mixed tank.

In yet another embodiment, the water heater further includes one or more additional delay tanks disposed between the mixing tank and the hx domestic cold water inlet.

In yet another embodiment, the water heater further includes one or more additional lengths of fluid time delay pipes disposed between the mixing tank and the hx domestic cold water inlet.

In yet another embodiment, the time delayed mixed water temperature provides a causal feed forward control of the controllable three-way proportional valve for a stable regulation of the hot water at the hx domestic hot water outlet.

In yet another embodiment, the temperature sensor is disposed in an end of the mixing tank about adjacent to the at least one opening in the at least one baffle.

In yet another embodiment, the heat exchanger and the mixing tank are mechanically coupled to a common mounting skid.

In yet another embodiment, the feedforward control process comprises a polynomial process equation of $2^{nd}$ order or greater.

According to another aspect, a method for controlling a hot water temperature of a water heater includes: providing a heat exchanger having a hx cold water inlet fluidly coupled to a source of cold water and a mix tank, the mix tank having a cold water inlet and a constant flow hot water inlet; mixing the source of cold water with a constant flow of hot water from the heat exchanger in the mix tank to provide a mixed water; delaying the mixed water by a fluid delay time to provide a fluid time delayed mixed water; measuring a temperature of the fluid time delayed mixed water in the mixing tank to provide a temperature measurement of the fluid time delayed mixed water; and setting by a processor running a feedforward control process, a position of a proportional valve based on the temperature measurement of the fluid time delayed mixed water to control a flow of boiler water into the heat exchanger.

According to yet another aspect, a water heater includes a heat exchanger (hx) having a hx hot water inlet, a hx water return outlet, a hx domestic cold water inlet, and a hx domestic hot water outlet. A controllable three-way [linearized proportional] valve has a boiler water hot water inlet adapted to accept a boiler water, and to provide a proportionally controllable flow to the hx hot water inlet and boiler return water outlet, and the boiler return water outlet adapted to return a boiler return water to a boiler. A flow rate sensor is disposed in fluid communication with the hx domestic cold water inlet to provide a domestic cold water flow rate. A processor is operatively coupled to the flowrate sensor and operatively coupled to the controllable three-way [linearized proportional] valve. The processor runs a feedforward control process based on the domestic cold water flow rate to control a flow of boiler water into the heat exchanger. The feedforward control process adjusts [a proportional] *an* operating position of the controllable three-way [linearized proportional] valve to regulate a temperature of hot water at the hx domestic hot water outlet based on the domestic cold water flow rate.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

DETAILED DESCRIPTION

Figure 1A:
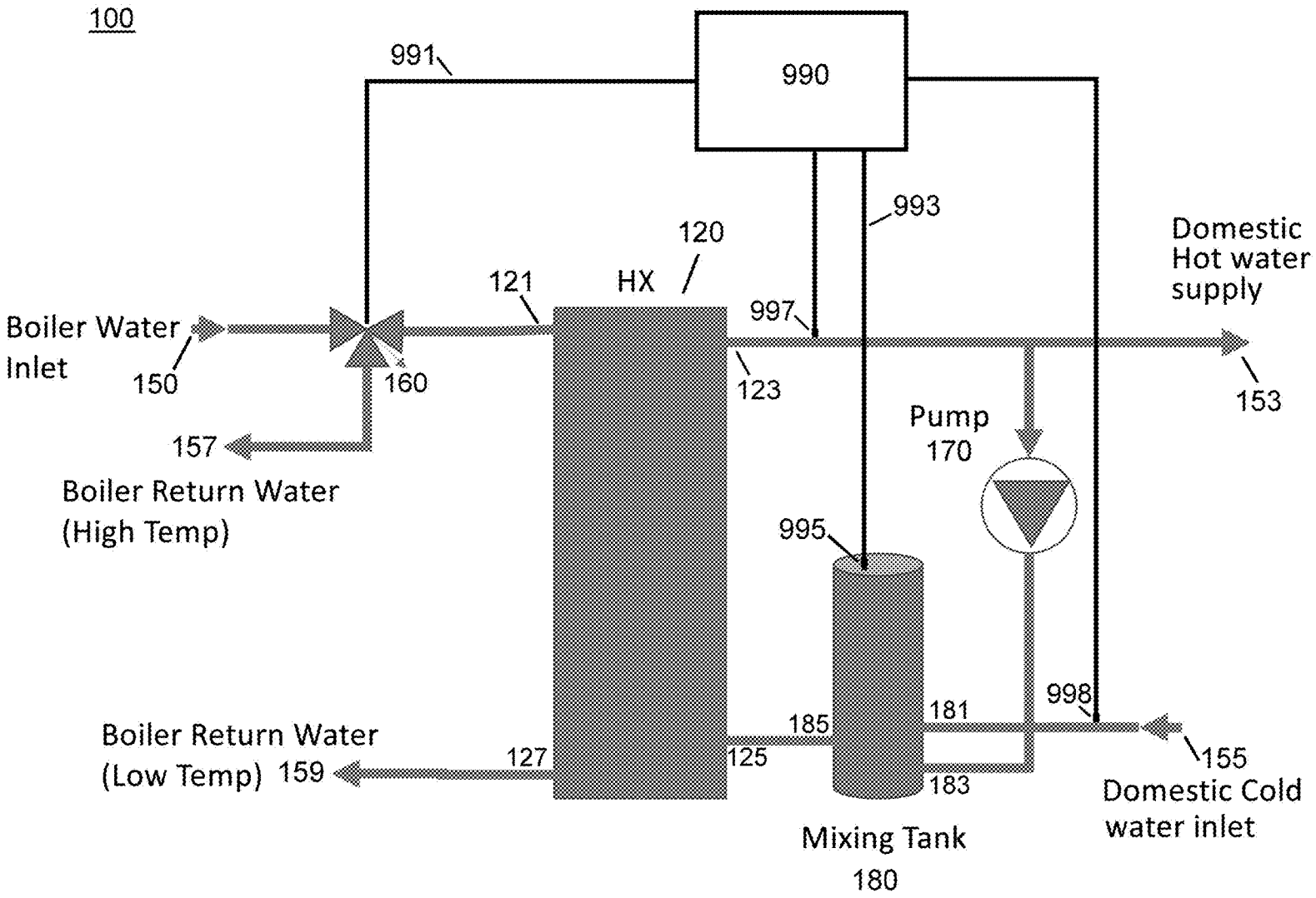
FIG. 1A shows an exemplary feedforward control system according to the Application.

A hot water system provides hot water to the hot water distribution pipes of a building. The quantity of hot water used by the building can vary by time of day, season, various types of machine cycles, etc. One problem is to regulate the temperature of the hot water supplied to the hot water pipes over varying loads. Short time frame changes in loads (e.g. minutes) can be particularly troublesome. For example, where a hot water heater's controls have ramped up to provide relatively high hot water flow rates, while maintaining the desired hot water temperature, if the flow rate should suddenly drop (e.g. one or more machine cycles stop using hot water), there can be an undesired period of time, during which the hot water which is too hot. In worst cases where the hot water is too hot, there may be a scald hazard to persons using hot water directly (e.g. sinks or shower). In applications using higher pressure or higher flow rates, building hot water temperature control can be more difficult.

In a feedforward control system, an action is taken according to a measured value. The actions are pre-programmed for expected measured values. Unlike a feedback system, the feedforward control system does not automatically adjust to control the measured value, but rather simply measures the value, then takes the pre-determined action based on the measurement, as an open loop control system.

One advantage of a feedforward system is that actions can be taken relatively quickly and decisively, consistent with an operating speed of the controlling device, actuator, valve, etc. However, especially as an open loop control system, there needs to be a causal relationship established and pre-determined, between the measured value and the quantity being controlled, as controlled, for example, by a proportional valve in a water heater system.

Particularly in larger commercial settings, domestic hot water is typically provided by heating a supplied domestic cold water from any suitable cold water source, such as a domestic cold water connection to a municipal water source. Water heaters can use any suitable heat exchanger, where heat energy from any suitable source of heat energy (e.g. hot water from boiler) heats the domestic cold water by heat transfer within the heat exchanger.

To better understand the new method of the Application, consider that in a more conventional approach of the prior art, one way to regulate the temperature of the hot water sent to the hot water pipes of the building is to measure the hot water temperature at the heat exchanger hot water outlet, and to take some controlled action based on that temperature to try to hold that temperature to desired value. Such control is a feedback type control, because the measured value is also the value being set by the control system.

Rather than directly measuring the heat exchanger hot water outlet temperature, a measurement of the temperature of a mix of hot water from the outlet of the heat exchanger which feeds the hot water pipes of the building and the domestic cold water flowing into the heat exchanger can be used to provide a feedforward measured value, to control the rate of flow of boiler water into the heat exchanger, to regulate the temperature of the domestic hot water supply. U.S. Pat. No. 9,243,848, WATER HEATING SYSTEM, describes an earlier improvement of control of a gas fired burner based on such a mixed water feedforward value. Because of the overall control system structure, the heat exchanger structure, and the response time of the gas fired burner, in the system of the '848 patent, it was possible to measure the mix water temperature in the regular piped connections. The water heater system of the '848 patent is self-contained in that the burner which provides a heated gas to the heat exchanger is self-contained within the same water heater cabinet. The '848 patent is also assigned to AERCO International, Inc., and is incorporated herein by reference in its entirety for all purposes.

In some commercial heating applications, there are alternative distributed systems, where, for example, a boiler system provides hot water to a separate heat exchanger in a different physical assembly, such as can be mounted on a different base or skid from the boiler.

One problem in such a distributed system is that the time relationship between some types of flow valves, such as where heat energy into a heat exchanger is set by controlling the flow of boiler water into the heat exchanger (as opposed to direct gas fired heated gas) is more complex, precluding the direct measurement of mix water which was possible, for example, in the self-contained gas fired water heater of the'848 patent.

Figure 4:
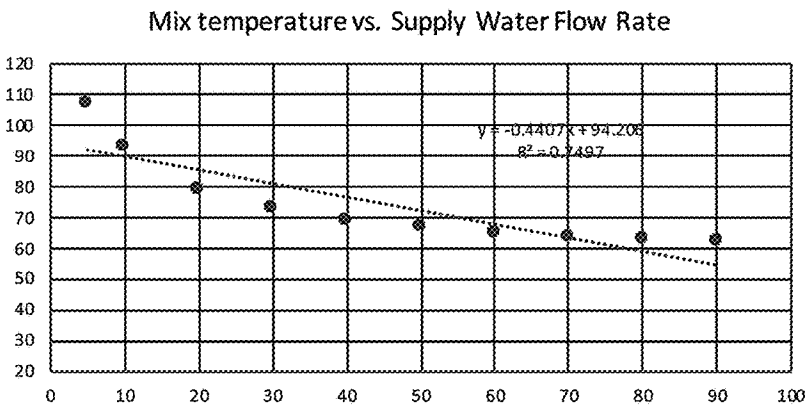
FIG. 4 is a MS Excel spread sheet showing an exemplary feedforward process relationship and equation.
Figure 4:
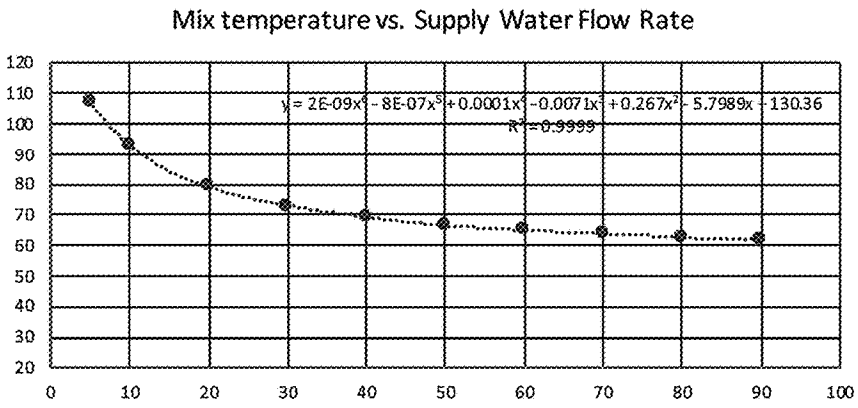

In a typical distributed system with a separate boiler and domestic hot water heater, the domestic hot water heater accepts boiler water to heat a source of potable domestic cold water to provide domestic hot water. The temperature of the boiler water is set by the boiler, and the boiler is typically not directly part of the control system of the water heater of the Application (i.e. the boiler may have a separate controller which established the temperature of the boiler water). The water heater of the Application accepts the boiler water and controls heat energy input to the heat exchanger type water heater by varying the flow of boiler water into the heat exchanger. The flow of boiler water into the heat exchanger of the water heater of the Application by a three-way valve. The three-way proportional valve divides the incoming boiler water proportionally between the flow to the water heater inlet, and a diversion path back to the boiler. At one end of the range of the three-way proportional valve, the most heat energy is supplied to heat exchanger when substantially all of the boiler water is provided to the heat exchanger boiler inlet, and substantially none of the boiler water is returned by the three-way proportional valve to the boiler. Conversely, the minimum heat energy is supplied to heat exchanger when substantially none of the boiler water is provided to the heat exchanger boiler inlet, and substantially all of the boiler water is returned by the three-way proportional valve to the boiler. More typically, the three-way proportional valve operates continuously somewhere between these two extreme positions, regulating the flow of heat energy into the heat exchanger as controlled by the heat exchanger control system. This relationship is described hereinbelow in more detail by an example as shown in FIG. 4.

In the prior art, the controller typically runs a feedback control system where the heat exchanger hot water heater controls the three-way proportional valve in response to a measurement of the domestic hot water temperature at the domestic hot water outlet of the heat exchanger.

As described hereinbelow by the Application, it was realized that a control of the flow rate of hot water (e.g. from a boiler) into a separate heat exchanger assembly can be more efficiently controlled based on an open loop feedforward measured value of the mix of hot water from the outlet of the heat exchanger which feeds the hot water pipes of the building and the domestic cold water flowing into the heat exchanger.

However, for the very different structure of three-way proportional valve to control the flow of boiler water into a heat exchanger, a direct measurement of mix water in the existing standard piping, was found to be inoperative for feedforward control.

In a feedforward system, the time relationship between the measured temperature value and the action of an actuator, here a proportional flow valve, should be aligned, such that there is a causal relationship between the measured temperature and the action of the valve. The valve operating time should be accounted for, so that the regulating action now corresponds causally to the measured feed forward mix water value. Without, such a causal system, the control system will be ineffective at best, and unstable at worst.

Therefore, in a separate boiler, heat exchanger distributed system, it was realized that there is also a need for a fluid delay element, which provides a desired delay to establish a causal feedforward control system to provide a stable control of the heat exchanger hot water outlet temperature.

Another problem is that there needs to be a structure to provide good mixing of the hot water from the outlet of the heat exchanger which feeds the hot water pipes of the building and the domestic cold water flowing into the heat exchanger to obtain a reliable, accurate, and robust feedforward temperature measurement value.

It was realized that one or more tanks including at least one mixing tank can solve both problems, to provide both the mixing action, and the desired fluid delay time. The mixing tank can include a mixing chamber, where the domestic cold water supply to the heat exchanger cold water inlet, mixes with hot water pumped from the hot water outlet of the heat exchanger. The pump is a constant flow type pump so as to establish known conditions for the development of a feedforward relationship (e.g. a look-up table in a controller) between the measured mix temperature and desired proportional valve settings. Moreover, by providing a baffle between the first mixing chamber and a second chamber, the length of the flow path can be increased, to provide another feature of the mixing tank, the desired fluid delay time. The delay time can also be set in part by the ratio between the diameter of the pipes supplying the domestic cold water supply to the heat exchanger cold water inlet and the pipe providing the hot water pumped from the hot water outlet of the heat exchanger to the mixing tank, and the diameter of the mixing tank (or, the relative size of the chambers to the diameter of the supply pipes).

FIG. 1A shows an exemplary feedforward control system according to the Application. In the exemplary embodiment of FIG. 1A, one mixing tank provides both of the desired mixing and fluid delay properties. The mixing property is enhanced by an internal baffle. Note that is unimportant whether the mixing action and fluid delay is incorporated into a single mixing tank, or if mixing and fluid delay are distributed between a mixing tank and one or more additional tanks or fluid delay lines (e.g. literally physical lengths of pipe to cause a fluid delay). As will be understood by those skilled in the art, desired fluid delays can be established by the ratio of the diameter of the pipes which couple the heat exchanger to the source of domestic cold water and the domestic hot water constant flow pipe, and the diameter and length of any fluid delay line pipe diameter and length and/or the diameter and length of any of the mixing tank and/or any additional delay tanks. However, in all of the above options, the mixing and delay features are provided by adding tanks and/or pipes which otherwise would not be present to merely fluidly couple (plumb) the various components together. Part of what is new is the realization that in addition to enhanced mixing, what is needed is an additional fluid delay time, which otherwise would not be present by normal structural connective plumbing, pipes, of a prior art assembly. The desired fluid delays are added by one or more tanks and/or elongated connecting pipes having a fluid flow path greater than what would have been the direct connections between components of a prior art water heater.

Now, referring to FIG. 1A in more detail, the solution of the Application provides a regulated temperature hot water supply 153 to the domestic hot water supply pipes of the building. The domestic hot water heater 100 uses a heat exchanger 120. The source of heat energy to heat the domestic hot water is a separate boiler (not shown in FIG. 1A). Boiler water 150 (hot "boiler" water from the boiler) is fluidly coupled to the heat exchanger boiler input 121 via a 3-way proportional valve 160. Boiler water 150, as provided by 3-way proportional valve 160 to heat exchanger 120, and returns at least in part (i.e., when there is boiler water flowed to the heat exchanger by the 3-way proportional valve 160) to the boiler as low temperature boiler return water 159 (much of the heat of the boiler water, having been removed by heating the domestic cold water through the heat exchange surfaces of the heat exchanger 120). The flow rate of boiler water 150 to the heat exchanger boiler input 121 is controlled by the 3-way proportional valve 160, where for the lower flows, the 3-way proportional valve 160 can divert high temperature boiler water directly back to the boiler (not shown in FIG. 1A) as boiler return water 157, or for higher flows the 3-way proportional valve can provide a higher flow of boiler water with less diversion of boiler return water 157 to the boiler. Any flow of boiler water 150 not diverted via the 3-way proportional valve 160 back to the boiler as boiler return water 157, returns to the boiler having flowed through the heat exchanger 120 as a low temperature boiler return water 159.

In some embodiments, such as the exemplary system of FIG. 1A, a boiler can have separate inlets to receive both a high temperature return water 157, as well as a low temperature return water 159. An advantage of such dual returns is that the boiler can heat the boiler water more efficiently by condensation caused by the lower temperature return water 159. One such boiler is the Benchmark® Platinum condensing boiler, available from AERCO International, Inc. of Blauvelt, N.Y. Alternatively, the boiler water from the 3-way proportional valve 160 could be combined with the boiler return water from the heat exchanger 120, however, then the total return water to the boiler, particularly where more boiler water is returned by the 3-way proportional valve 160, will be warmer, and a condensing type boiler will operate less efficiently. The alternative system can be completely operational, just less efficient overall.

Mixing tank 180 accepts hot water from the heat exchanger domestic hot water outlet 123 as pumped via pump 170 at the mixing tank hot water inlet 183 and cold domestic cold water 155 via the mixing tank cold water inlet 181. The mixed water is fed to the heat exchanger cold water inlet 125 from the mixing tank mixed water outlet 185.

The temperature of the domestic hot water at the heat exchanger domestic hot water outlet 123 is regulated to a desired temperature. However, in contrast to a traditional closed loop feedback system, a measured value of the domestic hot water supply 153 is not the measured temperature value used for control.

Rather, in the feedforward system according to the Application, the temperature of the mixed water is measured by temperature sensor 995 (or, in other embodiments, a flow meter of the domestic cold water into the heat exchanger, as described in more detail hereinbelow). The mixed water temperature can be measured at suitable location in either chamber of the mixing tank 180. In some embodiments, good results have been obtained by measuring mixed water temperature near the top of the first mix chamber. The mixed water temperature as measured by temperature sensor 995 is operatively conveyed by any suitable communications means, typically a wired connection 993, to controller 990. Controller 990 is any suitable processor based computer, typically a programmable logic controller (PLC), or alternatively any suitable processor, computer, microcomputer, etc. In some embodiments a controller may include more than one processor, such details of the controller are unimportant to the Application. 3-way proportional control valve 160 is also operatively conveyed (operationally coupled) by any suitable communications means, typically by a wired connection 991, to controller 990. Controller 990 runs a feedforward process which includes any suitable equation and/or lookup table to set the position of the proportional 3-way valve corresponding to any particular measured mixed water temperature to control the temperature of the domestic hot water supply 153 to any suitable desired value.

Improved accuracy—While feedforward control alone can provide a fully operational system with good temperature regulation, there can be some error between an operator set point temperature (e.g. an absolute desired hot water outlet temperature) and the actual regulated hot water outlet temperature (a bias error). That is, the hot water outlet temperature will be well controlled and regulated, but possibly at a slightly different temperature than the desired setpoint temperature. For an improved system absolute accuracy, there can be an additional feedback path which provides an error term to the controller based on an actual measurement of the hot water outlet temperature. Note that this second feedback element is still quite different than a conventional feedback loop of the prior art, where now the feedback parameter being controlled is the error term or the difference between actual outlet hot water temperature 997, FIG. 1A, and the set-point desired hot water temperature at the domestic hot water supply 153 by the operator (set point not shown in FIG. 1A, understood to be set by user interface device connected to controller 990, such as, for example, any suitable: user buttons, numeric displays, LED or LCD graphical display, touchscreen, or any suitable combination thereof). An adaptive filter alone in the feed-forward path that works to minimize the measured error could also be used, i.e. not a PID type of controller where the gains are preset and can only be changed via manual intervention, but rather a fully automatic correction system. In summary, in this approach, there is the basic feedforward system of FIG. 1A, combined with a temperature sensor which measures the hot water outlet temperature, and which defines an error value within the process control program running on the controller 990 such that the hot water outlet water more closely follows absolutely, an operator set point temperature for the hot water.

Figure 1B:
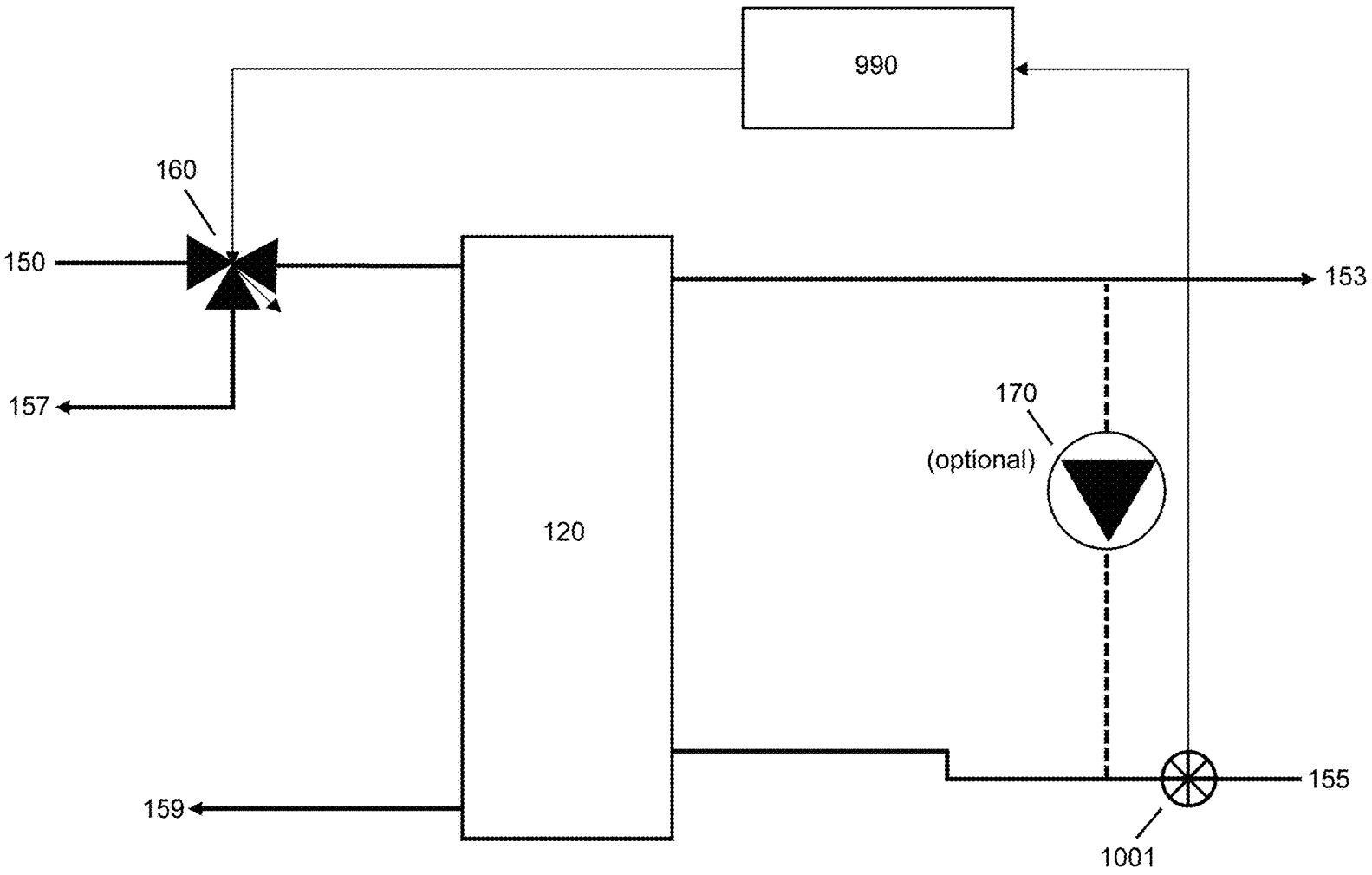
FIG. 1B is a drawing showing a schematic diagram of a hot water system with a flowmeter flow rate value as the feedforward parameter for a hot water heater.
Figure 1C:
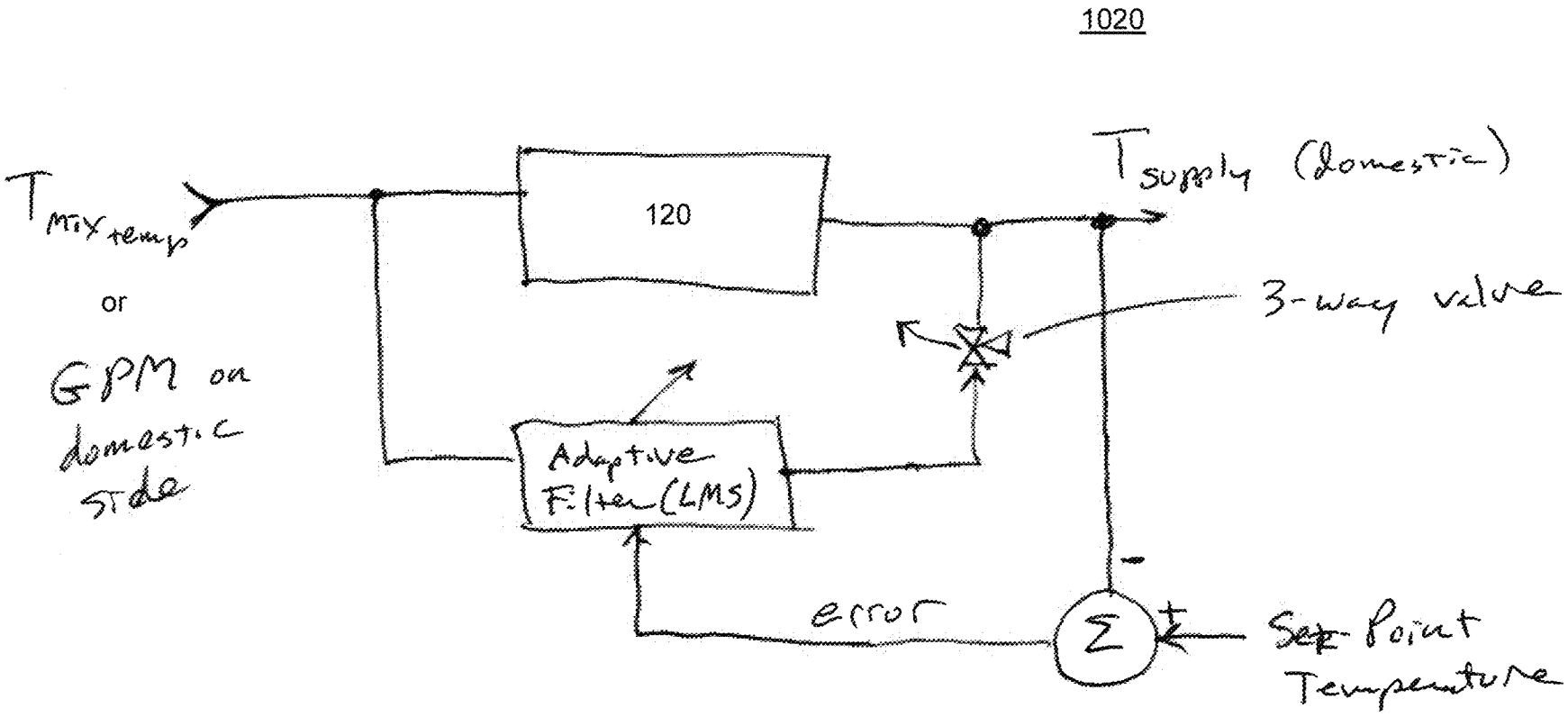
FIG. 1C is a drawing showing an exemplary control loop diagram illustrating control by mixed water temperature and hot water outlet temperature.

Exemplary control loop—FIG. 1C is a drawing showing an exemplary control loop diagram illustrating control by mixed water temperature and outlet temperature (the optional feedback to reduces offset error. The water heaters of the application include a heat exchanger (PFHX), such as, for example heat exchanger 120 of FIG. 1A. In the exemplary control system of FIG. 1C, the feedforward value is either the mixed water temperature (FIG. 1A), or the flow rate (e.g. GPM) of the domestic cold water into the water heater (FIG. 1B). It turns out that where the feedback is a flowrate value, the adaptive filter typically used with a mixed water temperature feedforward value can be replaced with a simple PID control, or even a relatively simple ladder-logic solution of a typical programmable logic controller (PLC).

Alternative to feedback correction—In an alternative system where there is no feedback correction based on an actual measurement of the hot water outlet temperature, there can be an additional temperature sensor to measure the Domestic Cold water inlet temperature 998, FIG. 1, to run only feedforward control (this is temperature T2 in the excel spreadsheet). The temperature set-point (T1) and measure T3 (mix temperature) are known, so an equation can be used to figure inlet flow rate and therefore valve position. Such an example is described in more detail hereinbelow with regard to FIG. 4.

Constant flow pump—As use herein, "constant flow" does not mean only one flow rate, rather for a desired or pre-set flow rate, the flow rate is a substantially constant desired or pre-set flow rate. For example, there can be a fixed speed constant flow rate that only provides one fixed flow rate determined at time of manufacture. Or, in other embodiments, there can be a variable speed pump, which can provide either increments or more typically a continuum of settable constant flow rates. In other words, the constant flow pump can optionally be a variable speed pump having a plurality of preset or selectable constant flow rates. Such variable speed pumps are well known in the art.

The use of a Variable Speed pump (e.g. for pump 170) can help the Signal-to-Noise ratio of the measured mixed water temperature. Such an improvement of the S/N of the measured mixed water temperature value can be an adaptive process. Or, there can be a pre-determined relationship, set at time of manufacture, time of installation, or set as a function of the temperature setpoint and inlet water temperature. For example, the greater the difference between the setpoint temperature and the inlet supply temperature, the better the signal-to-noise in the measured mix-temperature. Mixed water temperature S/N can be so improved, for example, by flowing more recirculation water into the mix tank. See for example: the slope of the line at the higher flow rates in the excel spread sheet, FIG. 4, such as, at 90 GPM to 80 GPM.

Figure 2A:
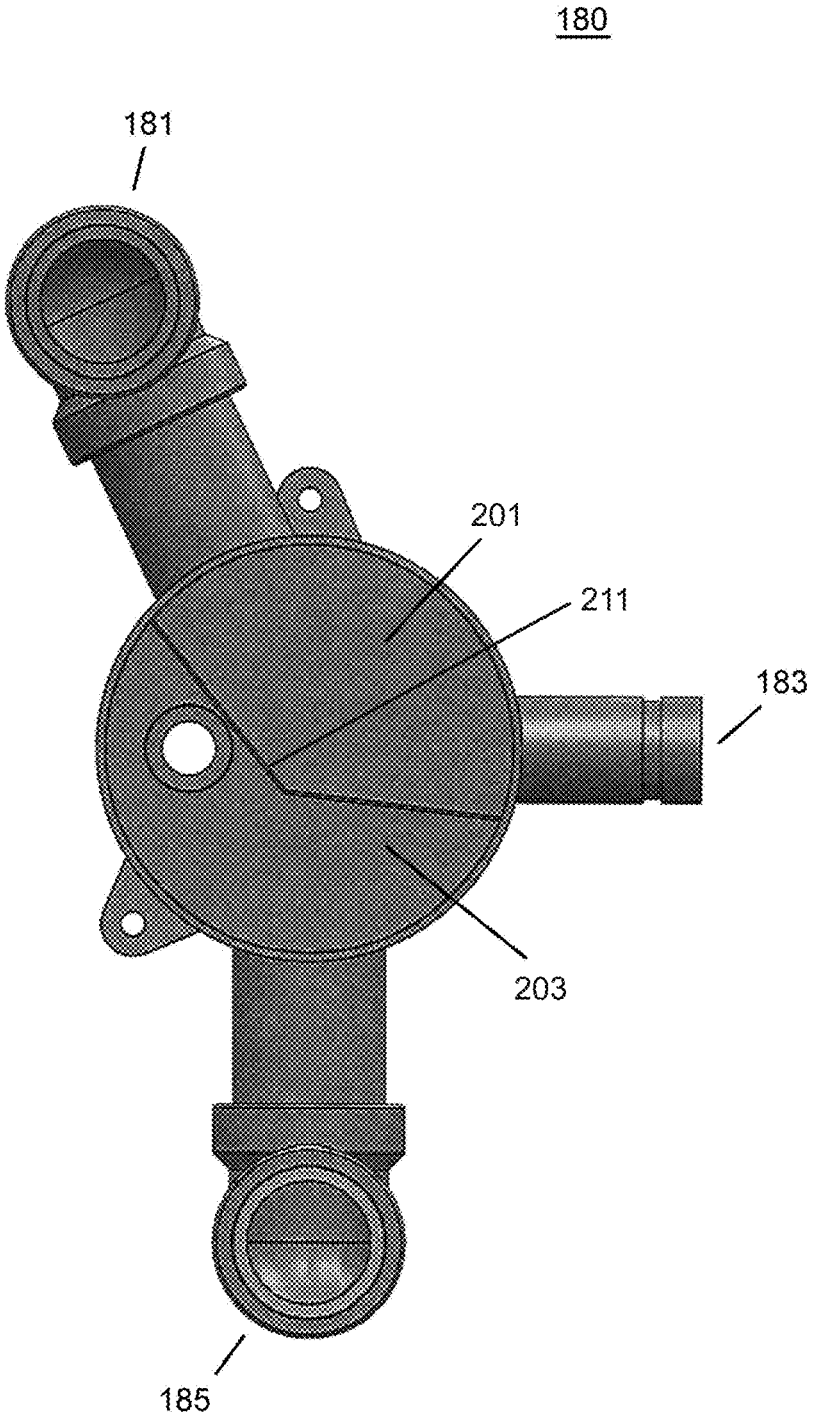
FIG. 2A is a top view of an exemplary mixing tank.
Figure 2B:
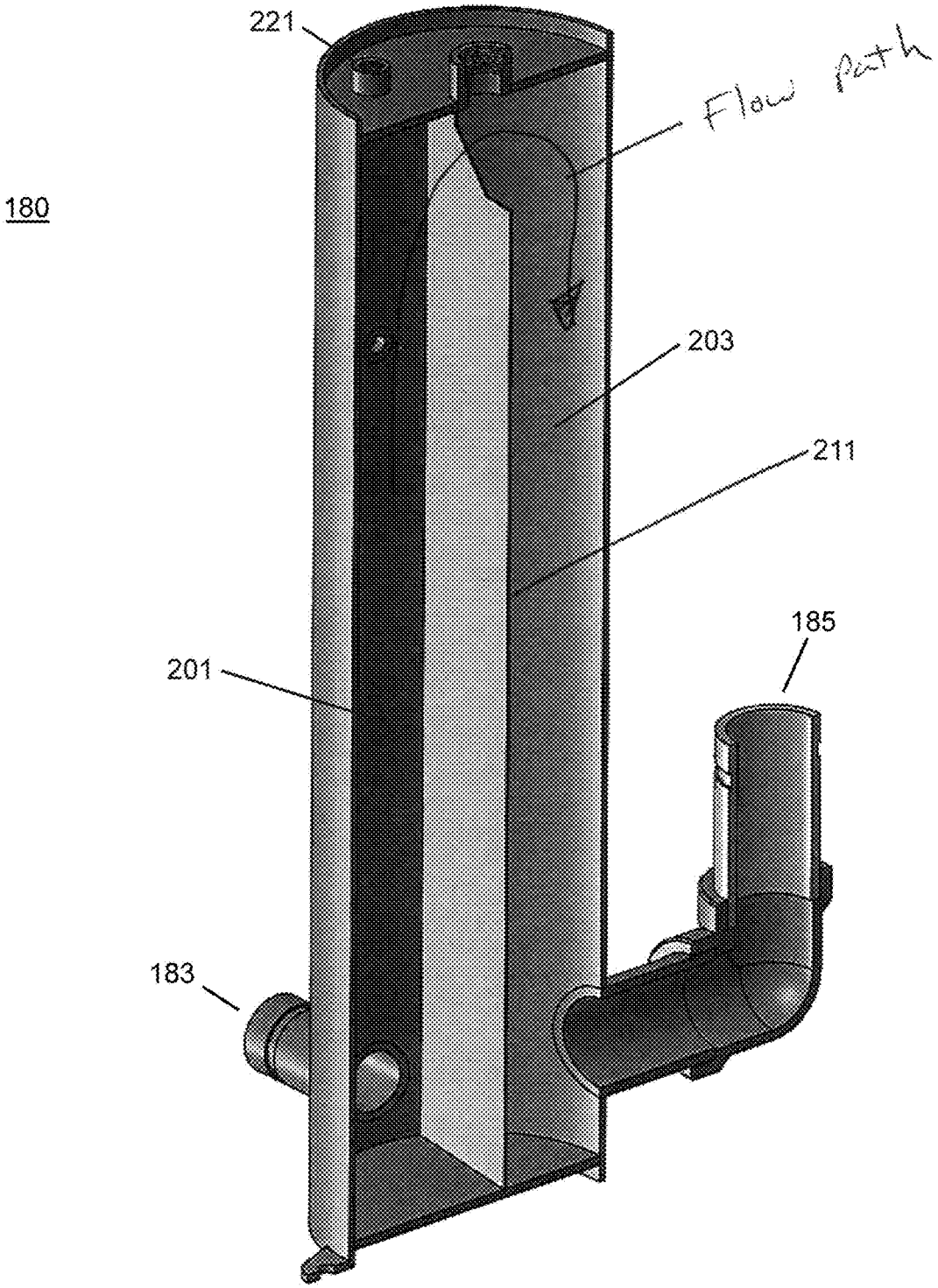
FIG. 2B is a section view of the mixing tank of FIG. 2A.

Mixing tank—An exemplary mixing tank is shown in FIG. 2A and FIG. 2B. FIG. 2A is a top view of an exemplary mixing tank 200 according to the Application in more detail. There are two chambers, mixing chamber 201 (which also adds fluid delay time) and delay chamber 203. Mixing chamber 201 is separated from delay chamber 203 by baffle 211. As seen in the top view of FIG. 2A, baffle 211 can optionally include a V-shaped (here a relatively shallow "open" V-shaped bend) to enhance the mixing efficiency of the cold water and the constant flow hot water.

Mixing tank hot water inlet 183 accepts hot water such as, for example, from a heat exchanger domestic hot water outlet 123 as pumped via pump 170 as shown in FIG. 1A. Mixing tank cold water inlet 181 receives cold water, such as, for example, from a domestic cold water inlet 155, FIG. 1A. The details of the mechanical type couplings and/or fluid connections and directions (e.g. elbows or not) at any of the inlets or outlet of the mixing tank can be of any suitable type, and the types of fluid coupling and directions of coupling to the exterior of the mixing tank are unimportant.

The mixed water outlet 185 provides mixed water, for example, to the heat exchanger cold water inlet 125, FIG. 1A. The mixed water temperature above the baffle 211 can be sensed via access port 221. FIG. 2B is a section view of the mixing tank of FIG. 2A and shows how water flows from the mixing chamber 201 through an opening in the baffle, to the delay chamber 203. Note that in the exemplary embodiment of FIG. 2B, both inlets and outlets are placed relatively low and distant from the opening in the baffle to increase the length over which the mixed water flows from the mixed chamber to the outlet for a desired fluid delay time. The fluid delay time is established by a combination of the ratio of the diameter of the inlet pipes to the diameter of the mix tank, as well as the length of the fluid flow from inlets to outlet. For example, as the ratio of the diameter of the mix tank to the diameter of the inlet pipes increases, the flow rate is decreased, and the fluid delay time is increased. Similarly, if the length of the mix tank is increased (and/or if additional baffles are used for a serpentine fluid path), the fluid delay time increases.

Figure 2C:
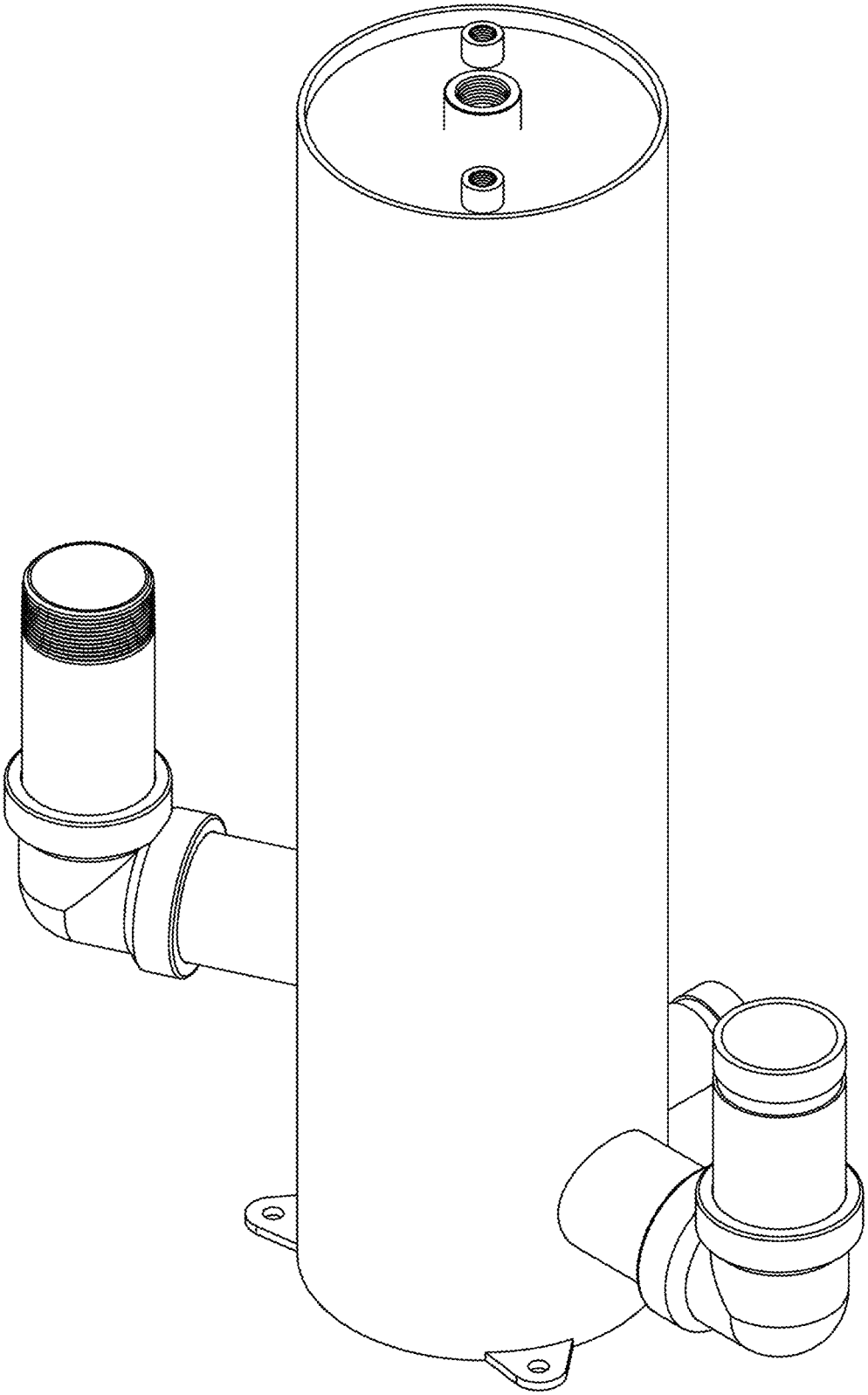
FIG. 2C is a drawing showing a perspective view of another exemplary mixing tank.
Figure 2D:
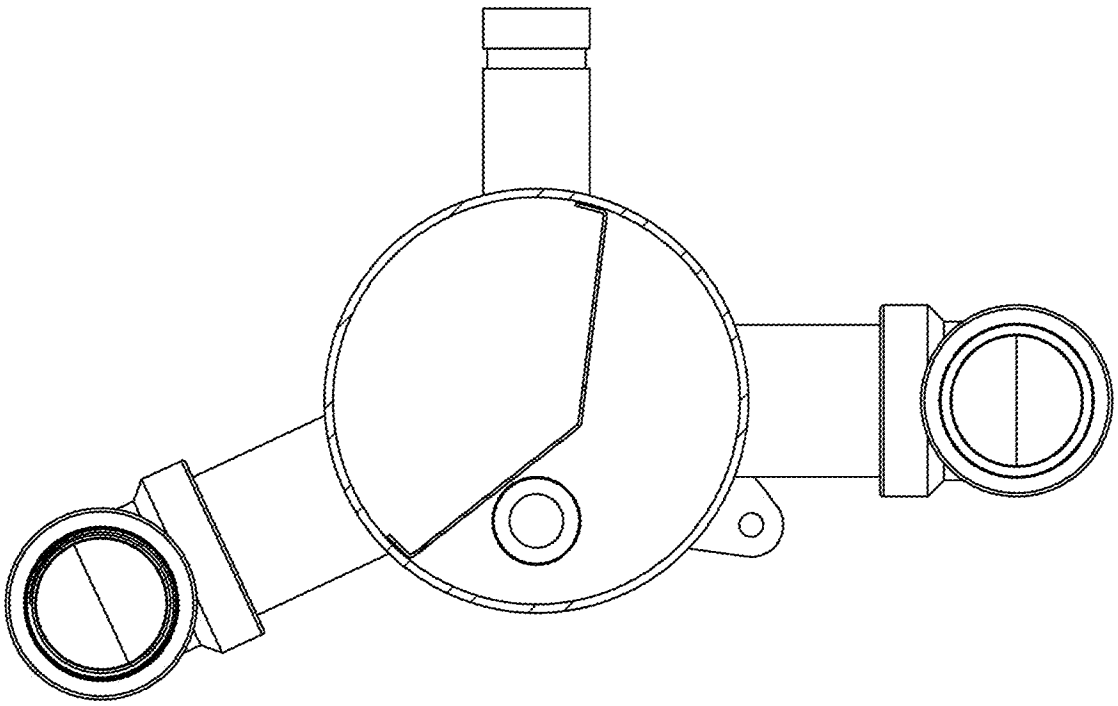
FIG. 2D is a drawing showing a top view of the mixing tank of FIG. 2C.
Figure 2E:
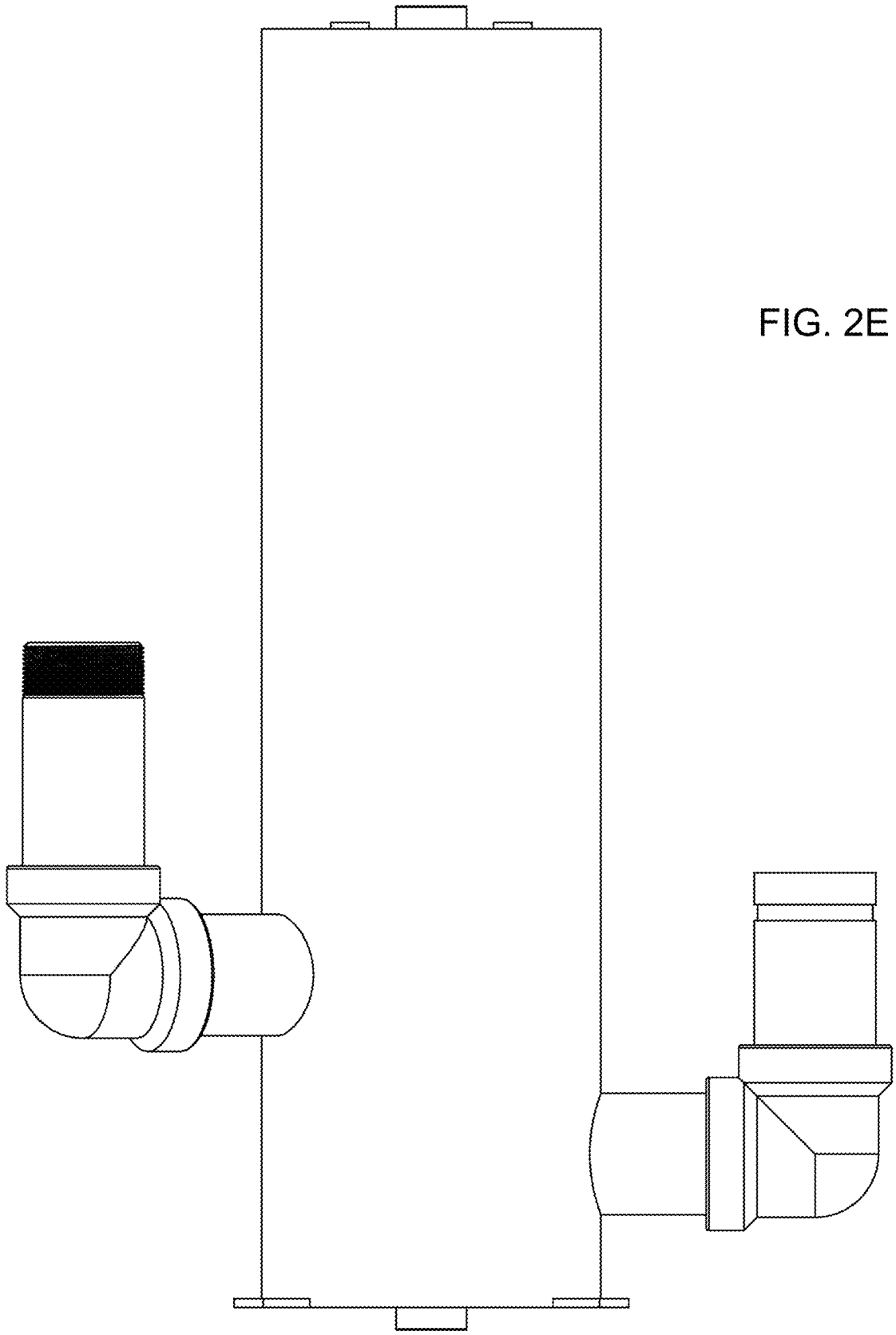
FIG. 2E is a drawing showing a side view of the mixing tank of FIG. 2C.
Figure 2F:
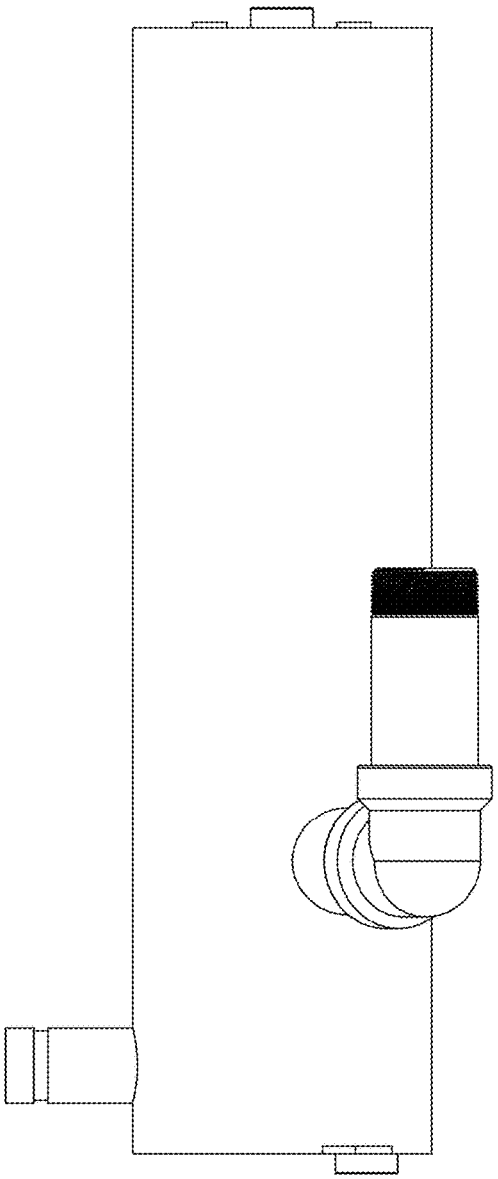
FIG. 2F is a drawing showing a different side view of the mixing tank of FIG. 2C.
Figure 2G:
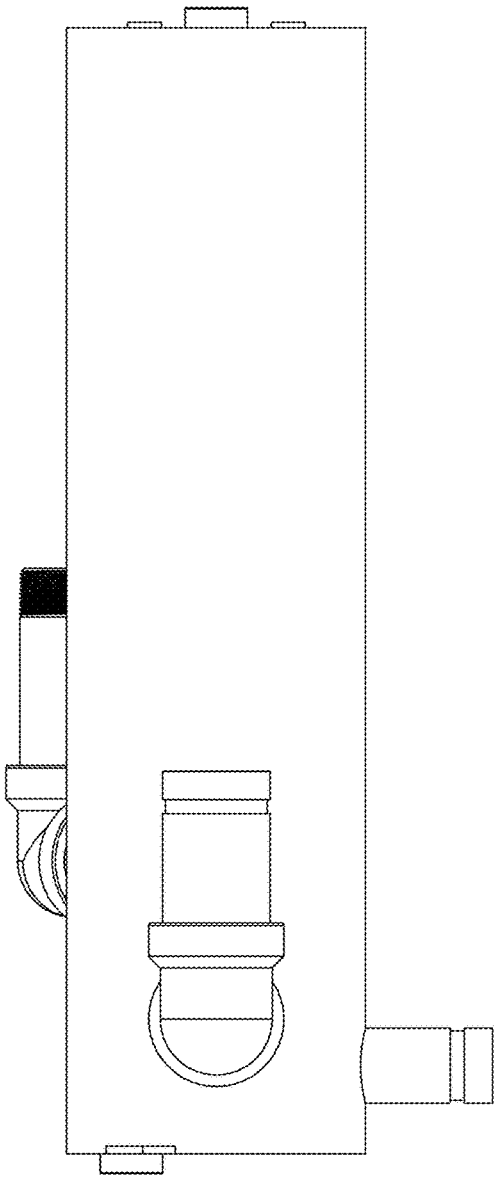
FIG. 2G is a drawing showing another different side view of the mixing tank of FIG. 2C.

FIG. 2C is a drawing showing a perspective view of another exemplary mixing tank. FIG. 2D is a drawing showing a top view of the mixing tank of FIG. 2C. FIG. 2E is a drawing showing a side view of the mixing tank of FIG. 2C. FIG. 2F is a drawing showing a different side view of the mixing tank of FIG. 2C. FIG. 2G is a drawing showing another different side view of the mixing tank of FIG. 2C.

Heat exchanger—Any suitable heat exchanger can be used. Exemplary implementations used a plate heat exchanger, specifically a SmartPlate exchanger available from AERCO International, Inc. of Blauvelt, N.Y. Exemplary suitable heat exchanger units include any suitable heat exchanger heater which can be used with boiler water on one side and domestic water heater on the other side such that the higher temperature boiler water heats the domestic water.

Figure 3A:
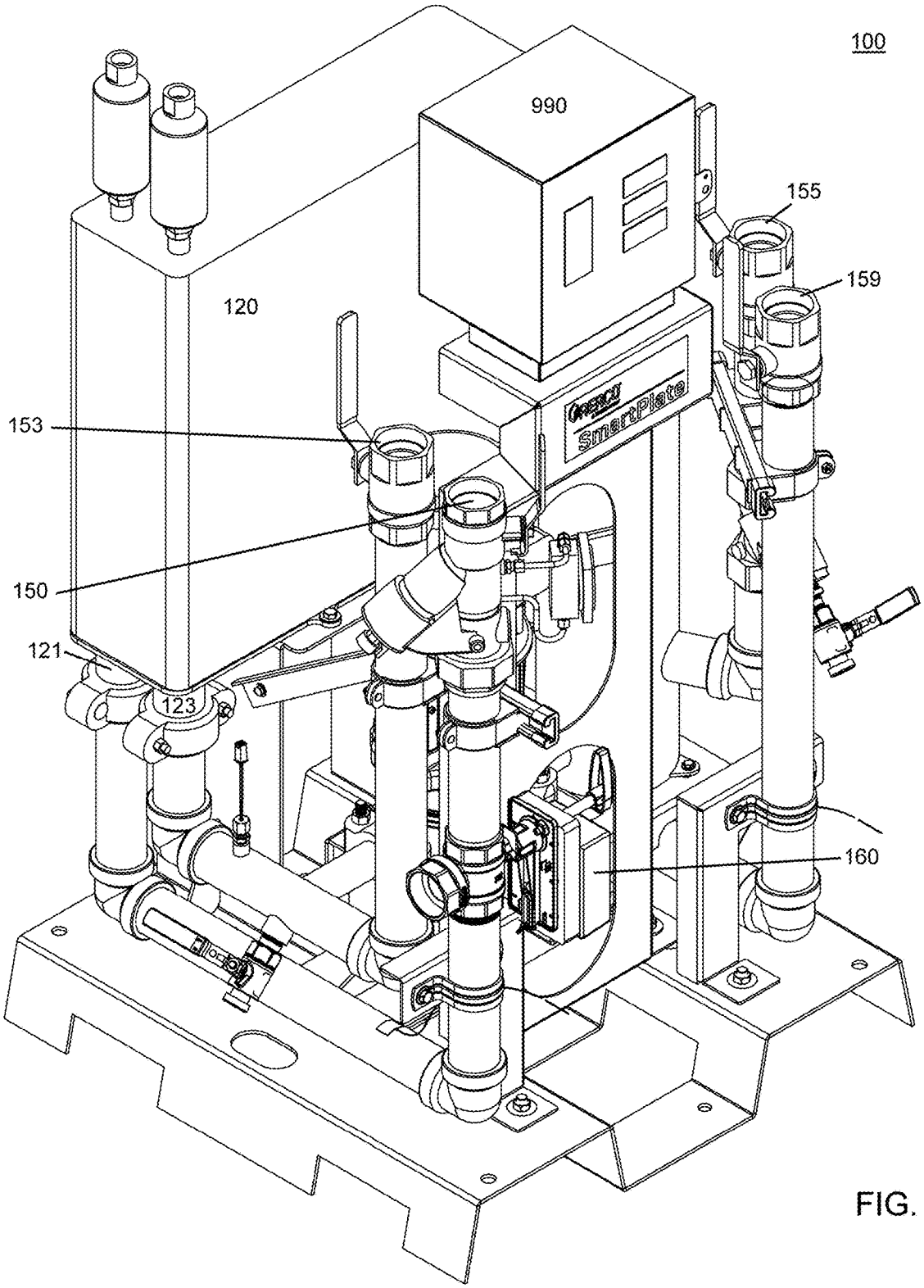
FIG. 3A is a drawing showing a perspective view the water heater skid of a feedforward boiler water heat exchanger water heater according to the Application.
Figure 3B:
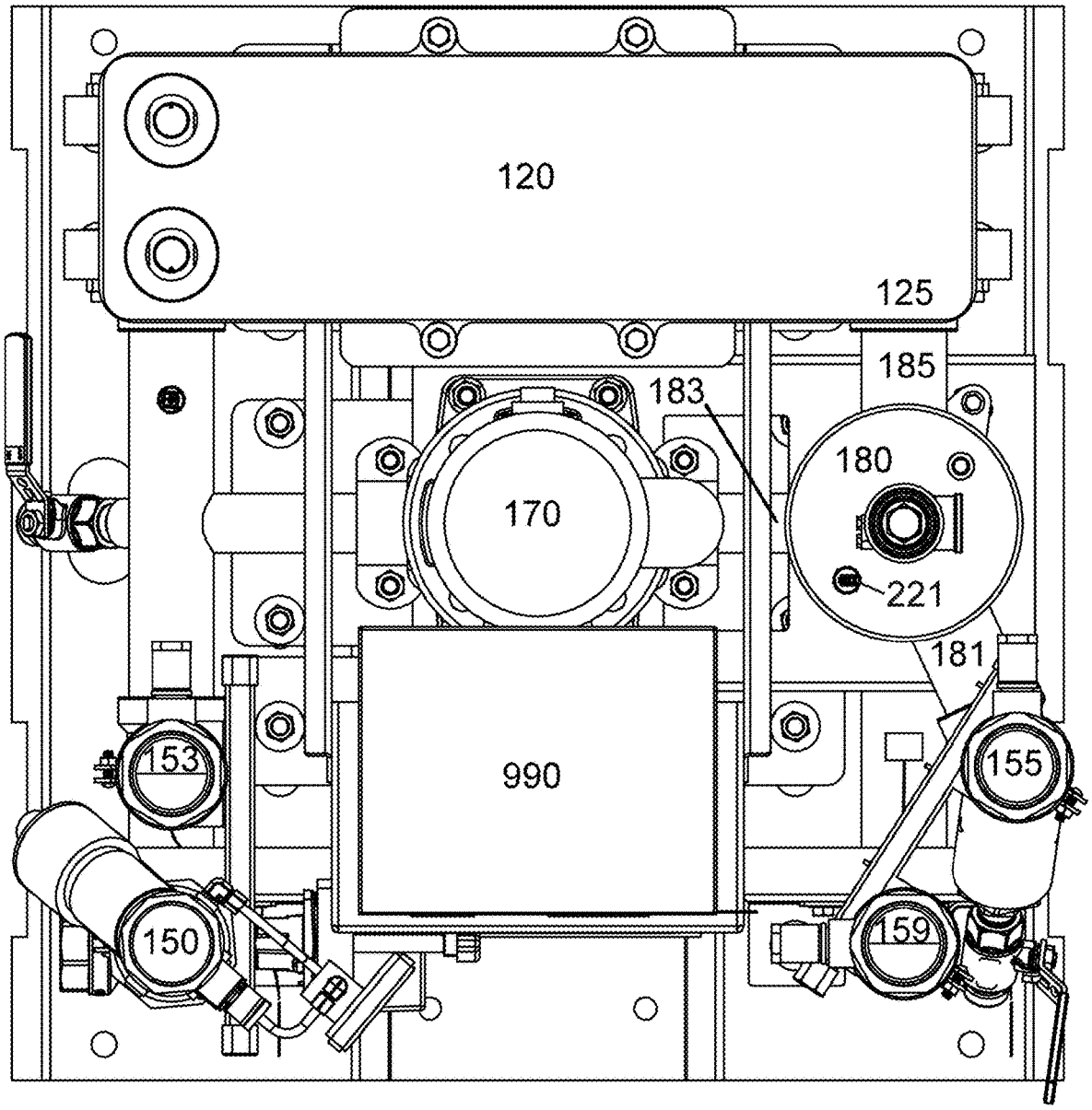
FIG. 3B is a drawing showing a top view of the water heater of FIG. 3A.
Figure 3C:
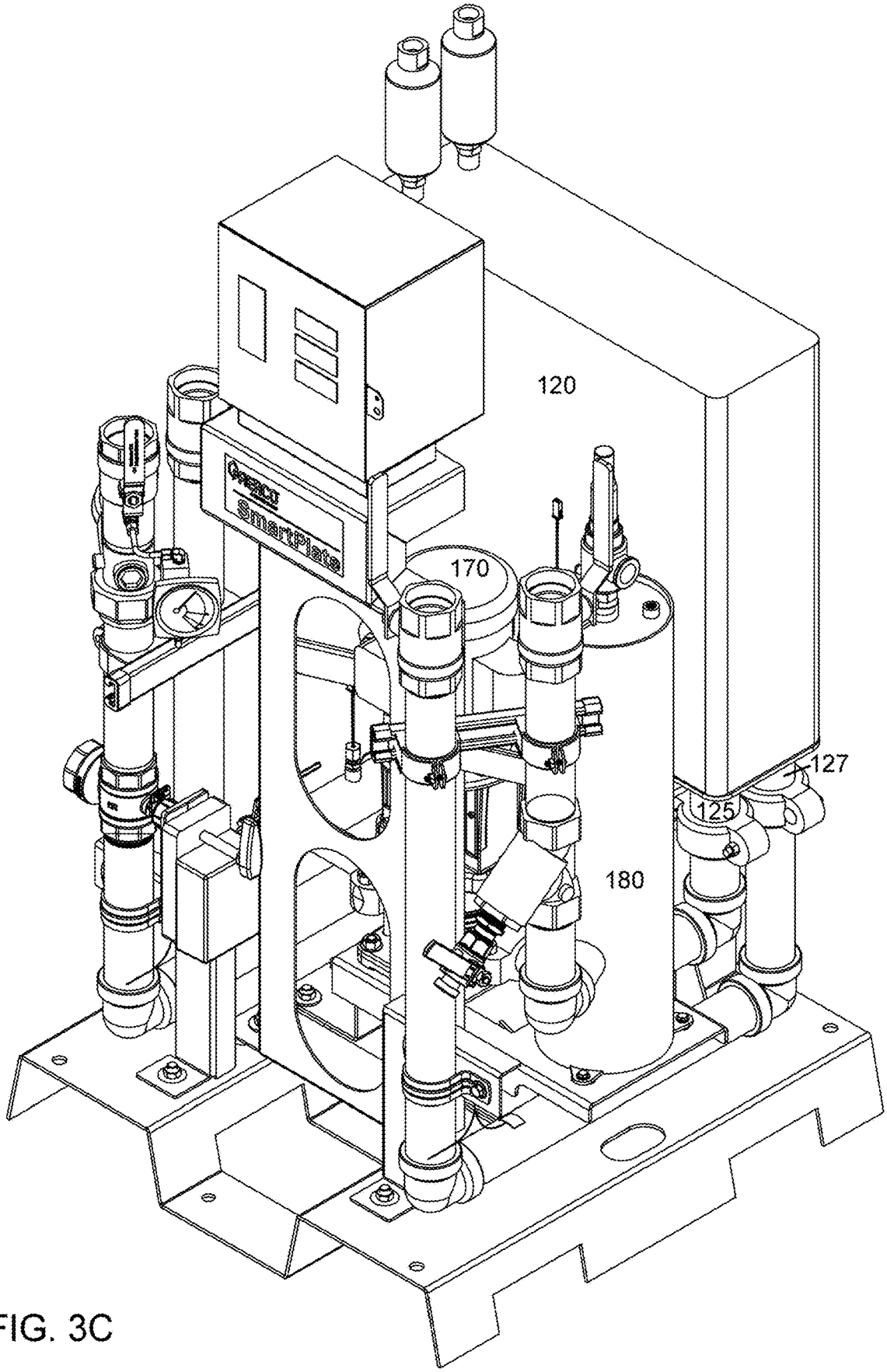
FIG. 3C is a drawing showing a different perspective view of the water heater of FIG. 3A.
Figure 3E:
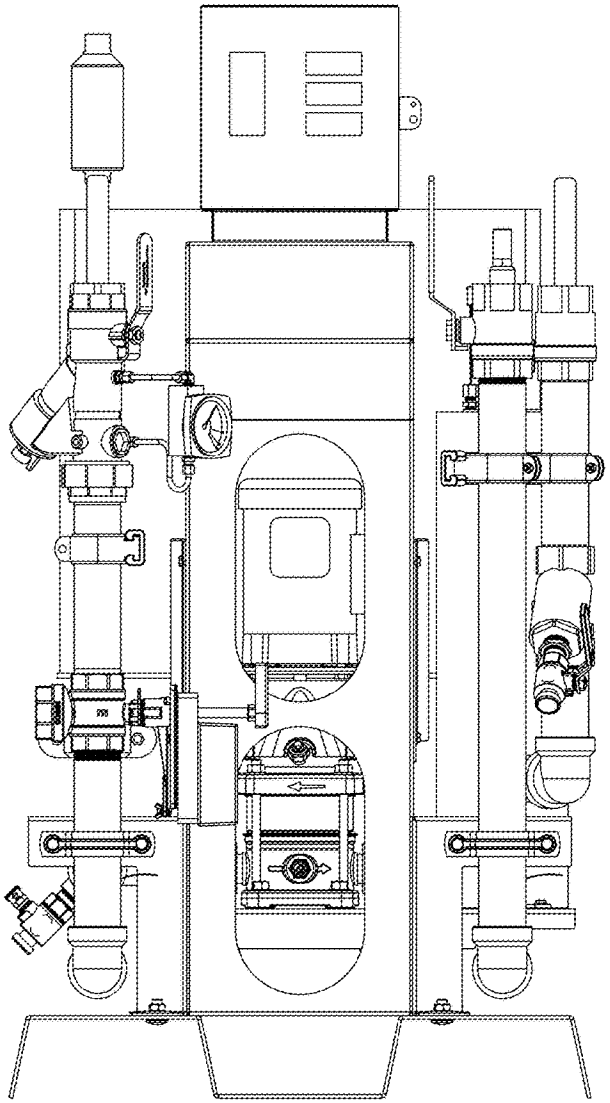
FIG. 3E is a drawing showing a front view of the water heater of FIG. 3A.
Figure 3D:
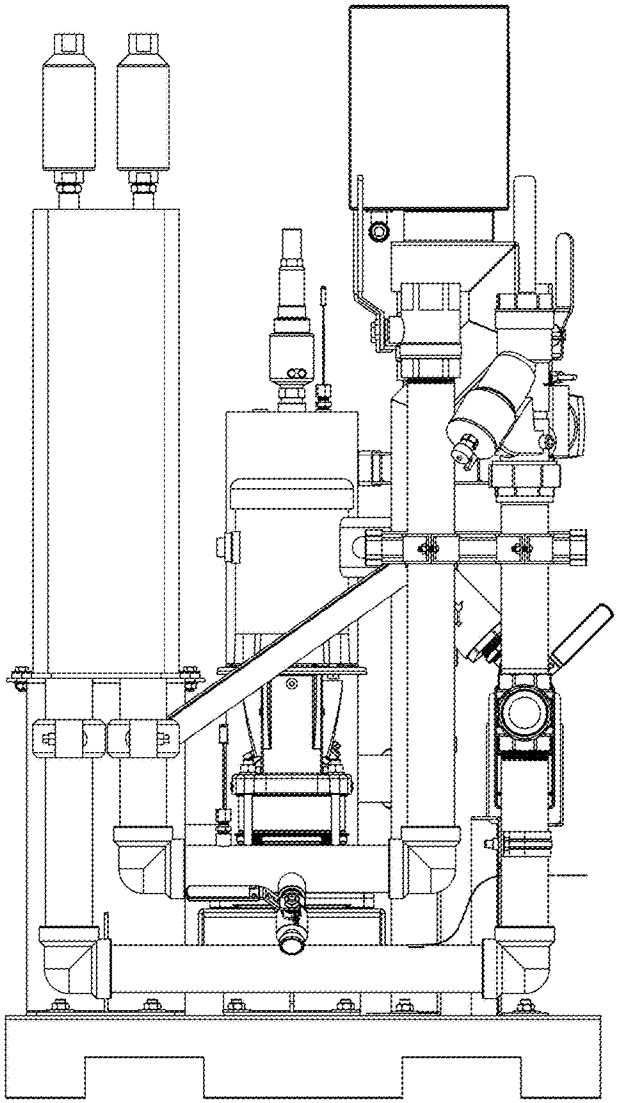
FIG. 3D is a drawing showing a left side view of the water heater of FIG. 3A.
Figure 3G:
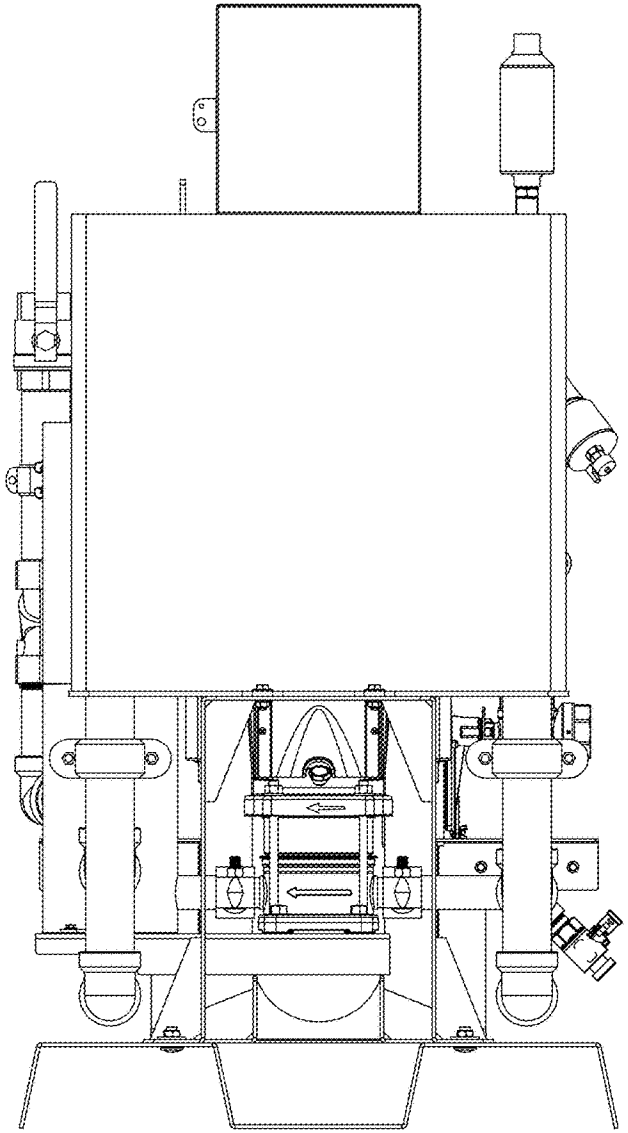
FIG. 3G is a drawing showing a back view of the water heater of FIG. 3A.
Figure 3F:
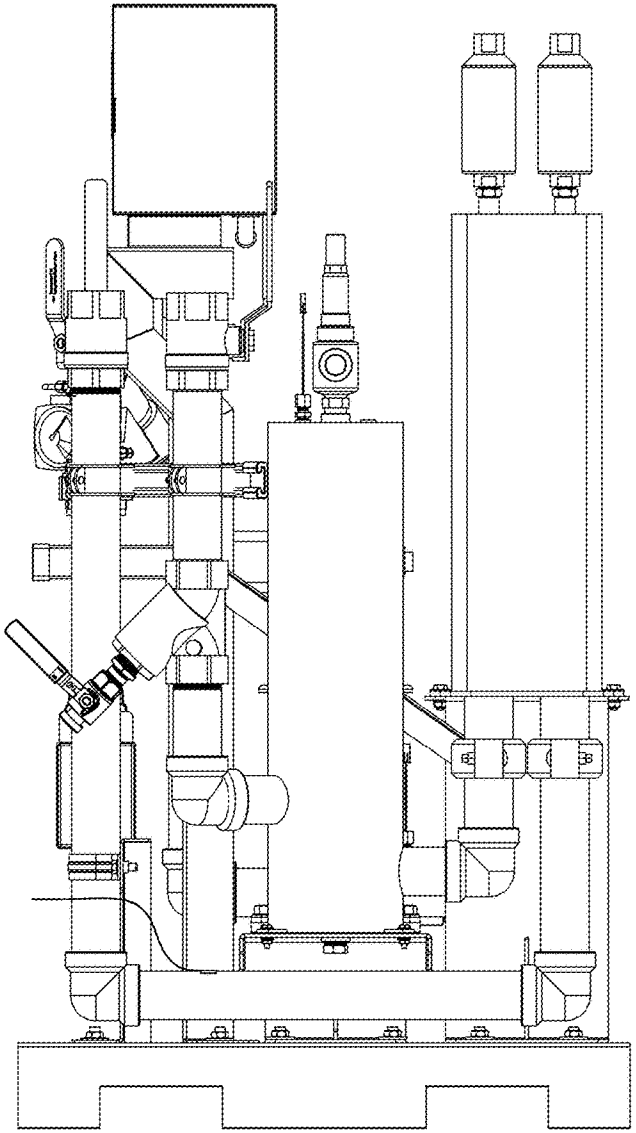
FIG. 3F is a drawing showing a right side view of the water heater of FIG. 3A.

Example—Water heater skid—A feedforward boiler water heat exchanger water heater according to the Application was built and tested as shown in FIG. 3A to FIG. 3G. FIG. 3A is a drawing showing a perspective view the water heater skid of a feedforward boiler water heat exchanger water heater according to the Application. FIG. 3B is a drawing showing a top view of the water heater of FIG. 3A. FIG. 3C is a drawing showing a different perspective view of the water heater of FIG. 3A. FIG. 3D is a drawing showing a left side view of the water heater of FIG. 3A. FIG. 3E is a drawing showing a front view of the water heater of FIG. 3A. FIG. 3F is a drawing showing a right side view of the water heater of FIG. 3A. FIG. 3G is a drawing showing a back view of the water heater of FIG. 3A.

Example—A hot water was built according to FIG. 3A to FIG. 3G. The physical dimensions of the entire unit as mounted on a common skid were about 30" wide by about 30" deep by about 55" high. The relatively small foot print and small volume assembly was found to provide a heating capacity of about 4.5 million BTU for a surprising efficient instant water heater in such a compact form factor. The hot water heater was found to maintain about +/−1° F. for steady water flow rates (about constant demand), and about +/−6° F. for relatively large (i.e. >50%) load changes, and about +/−4° F. for a <50% load change.

FIG. 4 is a MS Excel spread sheet showing an exemplary feedforward process relationship and equation. The Excel spread sheet shows an exemplary model of the controllable three-way proportional valve position on the supply side to the heat exchanger as a function of mixed water temperature.

As can been seen in the graphs of FIG. 4, the relationship is highly non-linear. One problem is that conventional linear fits (first order) of the prior art would be less efficient, or even inoperative in this feedforward process. Better feedforward control can be achieved by use of $2^{nd}$ order or higher polynomial for this relationship. Because the relationship is dependent on maximum flow rates and set point and entering water temperatures, for this exemplary model, a 140 F set point is used with a 55 F entering (supply) water for the domestic side with a maximum flow of 90 GPM (maximum BTU's). It was realized that higher order modeling for the feed-forward loop, as shown for example by the graph on the right side of FIG. 4 can be used for a more accurate feedforward process for a water heater according to the application.

Example—In the exemplary feedforward process of FIG. 4, a prior art controller may have attempted control by a linear feedforward process equation, $y=-0.4407x+94.206$, as shown by the graph on the left side of FIG. 4. However, a more accurate feedforward process was realized by the exemplary higher order ($6^{th}$) polynomial, $y=2E\text{-}09x6\text{-}8E\text{-}07x5+0.0001x4-0.0071x3+0.267x2-5.7989x+130.36$, as shown in the graph on the right side of FIG. 4.

Flow meter (flow sensor, 1001, FIG. 1B)—Alternative to feedforward based on a mix tank mixed water temperature—The mixed water temperature parameter can be replaced by a GPM value, such as can be measured by a flowmeter on the cold water supply line. Such an alternative feedforward control system can use a relatively simple control, such as, for example a PID (proportional, integral, derivative) controller.

Note that the controllable three-way proportional valve is a linearized valve, i.e. GPM is a substantially linear function of valve position. Especially where the valve is a linearized valve, i.e. GPM is a substantially linear function of valve position, a flow-rate measurement on the domestic cold water side, can be correlated by a feedforward process directly to the controllable three-way proportional valve position. Therefore, it was realized that a flow-rate measurement on the domestic cold water side, such as by any suitable flow meter, can be used as an alternative to the mix water temperature as the feedforward sensor value.

FIG. 1B is a drawing showing a schematic diagram of a hot water system with a flowmeter 1001 flow rate value as the feedforward parameter for a hot water heater. A flowrate sensor is not shown in FIG. 1A. In some embodiments, a flow rate sensor can be operatively coupled to the processor, where the water heater runs on a feedforward process to control a controllable three-way linearized proportional valve based on a measured flow rate of the domestic cold water entering the heat exchanger.

The flow sensor 1001 (GPM or velocity) is shown upstream of optional recirculation water pump 170 merely for illustration purposes. Where there is an optional pump 170 present, flow sensor 1001 can also be located downstream. The process controller (e.g. running a PID process) would adjust accordingly. The upstream measurement indicates the demand rate of hot water.

Where a flowmeter is used to provide a feedforward value of domestic cold water inlet flow rate in place of a temperature of mix water in a mix tank, a mix tank is not required. Similarly, the pump is also not required, however can still be optionally present, such as to help prevent scale build up in the heat exchanger, especially during times of near zero hot water supply loads. The pump can also provide other advantages of periodic or constant recirculation of hot water, such as for better heat transfer and more efficient thermal management (e.g. heat transfer from the boiler water to the hot water) on both sides of the heat exchanger.

Summary—In summary, and with respect to the exemplary embodiment of FIG. 1A, a water heater 100 includes a heat exchanger 120 (hx) having a hx hot water inlet 121, a hx water return outlet 127, a hx domestic cold water inlet 125, and a hx domestic hot water outlet 123. A controllable three-way proportional valve 160 has a boiler water hot water inlet 150 adapted to accept a boiler water, and to provide a proportionally controllable flow to the hx hot water inlet 121 and boiler return water outlet 157. The boiler return water outlet 157 is adapted to return a boiler return water to a boiler. A mixing tank 180 (mt) has a mt cold water inlet 181 adapted to receive a cold water from a source of domestic cold water 155, a mt hot water inlet 183, and a mt mixed water outlet 185. The mixing tank 180 mixes the cold water and a hot water from the mt hot water inlet 183. The mixing tank 180 provides a time delayed mixed water. A constant flow pump 170 is fluidly coupled to and disposed between the hx domestic hot water outlet 123 and the mt hot water inlet 183. A temperature sensor 995 is disposed in or on the mixing tank 180 to measure a temperature of the time delayed mixed water to provide a time delayed mixed water temperature. A processor 990 is operatively coupled to the temperature sensor 995 and operatively coupled to the controllable three-way proportional valve 160. The processor 990 runs a feedforward control process based on the temperature of the time delayed mixed water to control a flow of boiler water into the heat exchanger 120. The feedforward control process adjusts a proportional operating position of the controllable three-way proportional valve 160 to regulate a temperature of hot water at the hx domestic hot water outlet 153 based on the temperature of the time delayed mixed water temperature.

Software and/or firmware for the controller, including the feedforward process based on mixed water temperature can be provided on a computer readable non-transitory storage medium. A computer readable non-transitory storage medium as non-transitory data storage includes any data stored on any suitable media in a non-fleeting manner. Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A water heater comprising:

a heat exchanger (hx) having a hx hot water inlet, a hx water return outlet, a hx domestic cold water inlet, and a hx domestic hot water outlet;

a controllable three-way proportional valve having a boiler water hot water inlet adapted to accept a boiler water, and to provide a proportionally controllable flow to said hx hot water inlet and a boiler return water outlet, and said boiler return water outlet adapted to return a boiler return water to a boiler;

a mixing tank (mt) having a mt cold water inlet adapted to receive a cold water from a source of domestic cold water, a mt hot water inlet, and a mt mixed water outlet, said mixing tank to mix said cold water and a hot water from said mt hot water inlet, and said mixing tank to provide a time delayed mixed water;

a constant flow pump fluidly coupled to and disposed between said hx domestic hot water outlet and said mt hot water inlet;

a temperature sensor disposed in or on said mixing tank to measure a temperature of said time delayed mixed water to provide a time delayed mixed water temperature;

a processor operatively coupled to said temperature sensor and operatively coupled to said controllable three-way proportional valve, said processor to run a feedforward control process based on said temperature of said time delayed mixed water to control a flow of boiler water into said heat exchanger; and wherein said feedforward control process adjusts a proportional operating position of said controllable three-way proportional valve to regulate a temperature of hot water at said hx domestic hot water outlet based on said temperature of said time delayed mixed water temperature.

2. The water heater of claim 1, wherein said constant flow pump comprises a variable speed pump having a plurality of preset or selectable constant flow rates.

3. The water heater of claim 1, wherein said mixing tank comprises at least two chambers separated by at least one baffle with at least one opening in said at least one baffle.

4. The water heater of claim 3, wherein said at least two chambers comprise a mixing chamber and a fluid time delay chamber.

5. The water heater of claim 4, wherein said at least one baffle comprises an open V-shaped bend to enhance a mixing action in said mixing chamber.

6. The water heater of claim 3, wherein said at least one opening in said at least one baffle is disposed about adjacent to a first end of said mixing tank.

7. The water heater of claim 6, wherein said temperature sensor is disposed in said first end of said mixing tank.

8. The water heater of claim 1, wherein said mixing tank comprises a plurality of baffles, each baffle having at least one opening to provide a serpentine flow path through said mixed tank.

9. The water heater of claim 1, further comprising one or more additional delay tanks disposed between said mixing tank and said hx domestic cold water inlet.

10. The water heater of claim 1, further comprising one or more additional lengths of fluid time delay pipes disposed between said mixing tank and said hx domestic cold water inlet.

11. The water heater of claim 1, wherein said time delayed mixed water temperature provides a causal feed forward control of said controllable three-way proportional valve for a stable regulation of said hot water at said hx domestic hot water outlet.

12. The water heater of claim [1] *3*, wherein said temperature sensor is disposed in an end of said mixing tank about adjacent to said at least one opening in said at least one baffle.

13. The water heater of claim 1, wherein said heat exchanger and said mixing tank are mechanically coupled to a common mounting skid.

14. The water heater of claim 1, wherein said feedforward control process comprises a polynomial process equation of $2^{nd}$ order or greater.

15. The water heater of claim 1, further comprising a domestic hot water temperature sensor thermally coupled to hot water flowing from said hx domestic hot water outlet and operationally coupled to said [controller] *processor*, a domestic hot water temperature value measured by said domestic hot water temperature sensor as input to an additional feedback process running on said processor to remove offset error between said domestic hot water temperature value and a desired domestic hot water temperature setpoint value.

16. The water heater of claim [1] *15*, further comprising a domestic cold water inlet temperature sensor thermally coupled to cold water flowing into said water heater and operationally coupled to said [controller] *processor*, a domestic cold water temperature value measured by said domestic hot water temperature sensor as additional input to said feedforward process running on said processor to improve an accuracy of said temperature of hot water at said hx domestic hot water outlet.

17. A method for controlling a hot water temperature of a water heater comprising:

providing a heat exchanger having a hx cold water inlet fluidly coupled to a source of cold water and a mix tank, said mix tank having a cold water inlet and a constant flow hot water inlet;

mixing said source of cold water with a constant flow of hot water from said heat exchanger in said mix tank to provide a mixed water;

delaying said mixed water by a fluid delay time to provide a fluid time delayed mixed water;

measuring a temperature of said fluid time delayed mixed water in said mixing tank to provide a temperature measurement of said fluid time delayed mixed water; and setting by a processor running a feedforward control process, a position of a proportional valve based on said temperature measurement of said fluid time delayed mixed water to control a flow of boiler water into said heat exchanger.

18. A water heater comprising:

a heat exchanger (hx) having a hx hot water inlet, a hx water return outlet, a hx domestic cold water inlet, and a hx domestic hot water outlet;

a controllable three-way [linearized proportional] valve having a boiler water hot water inlet adapted to accept a boiler water, and to provide a proportionally controllable flow to said hx hot water inlet and boiler return water outlet, and said boiler return water outlet adapted to return a boiler return water to a boiler;

a flow rate sensor disposed in fluid communication with said hx domestic cold water inlet to provide a domestic cold water flow rate;

a processor operatively coupled to said flowrate sensor and operatively coupled to said controllable three-way [linearized proportional] valve, said processor to run a feedforward control process based on said domestic cold water flow rate to control a flow of boiler water into said heat exchanger; and wherein said feedforward control process adjusts [a proportional] *an* operating position of said controllable three-way [linearized proportional] valve to regulate a temperature of hot water at said hx domestic hot water outlet based on said domestic cold water flow rate.

19. The water heater of claim [18] *20*, further comprising a constant flow pump fluidly coupled to and disposed between said hx domestic hot water outlet and said mt hot water inlet.

20. The water heater of claim 18, further comprising a mixing tank (mt) having a mt cold water inlet adapted to receive a cold water from a source of domestic cold water, a mt hot water inlet, and a mt mixed water outlet, said mixing tank to mix said cold water and a hot water from said mt hot water inlet, and said mixing tank to provide a time delayed mixed water.

* * * * *